(12) United States Patent
Huber

(10) Patent No.: US 8,622,298 B2
(45) Date of Patent: Jan. 7, 2014

(54) LOADING SYSTEM AND METHOD FOR LOADING A CARGO HOLD OF AN AIRCRAFT

(75) Inventor: Thomas Huber, Schliersee (DE)

(73) Assignee: Telair International GmbH (DE)

( * ) Notice: Subject to any disclaimer, the term of this patent is extended or adjusted under 35 U.S.C. 154(b) by 180 days.

(21) Appl. No.: 13/054,916

(22) PCT Filed: Jul. 24, 2009

(86) PCT No.: PCT/EP2009/005404
§ 371 (c)(1),
(2), (4) Date: Apr. 1, 2011

(87) PCT Pub. No.: WO2010/009899
PCT Pub. Date: Jan. 28, 2010

(65) Prior Publication Data
US 2011/0313563 A1 Dec. 22, 2011

(30) Foreign Application Priority Data

Jul. 24, 2008 (DE) .......................... 10 2008 034 576
Nov. 13, 2008 (DE) .......................... 10 2008 057 076

(51) Int. Cl.
*G06K 7/08* (2006.01)

(52) U.S. Cl.
USPC ............. 235/451; 340/5.5; 340/540; 340/946

(58) Field of Classification Search
USPC .................... 235/451; 340/5.5, 540, 945
See application file for complete search history.

(56) References Cited

U.S. PATENT DOCUMENTS

| | | | |
|---|---|---|---|
| 5,627,517 A | | 5/1997 | Theimer et al. |
| 2002/0130778 A1 | | 9/2002 | Nicholson |
| 2006/0038077 A1 | | 2/2006 | Olin et al. |
| 2007/0119926 A1 | * | 5/2007 | Sloan et al. .................... 235/384 |
| 2007/0285240 A1 | * | 12/2007 | Sensenig et al. ........... 340/572.1 |
| 2008/0122626 A1 | * | 5/2008 | Ehrman et al. ............. 340/572.1 |
| 2010/0072380 A1 | * | 3/2010 | Britton et al. ............ 250/370.07 |
| 2010/0213313 A1 | * | 8/2010 | Reed et al. .................. 244/118.1 |
| 2010/0277345 A1 | * | 11/2010 | Rodriguez et al. ............ 340/945 |

FOREIGN PATENT DOCUMENTS

| | | |
|---|---|---|
| DE | 102 12 123 A1 | 10/2003 |
| DE | 10338704 A1 | 3/2005 |
| DE | 10 2005 026 898 A1 | 1/2006 |
| WO | 94/27117 A1 | 11/1994 |

(Continued)

OTHER PUBLICATIONS

Klaus, Schmoetzer; Automated Cargo Identification & Tracing—Potentialities of RFID's within AIR Freight Logistics; Cool Chain Association; Jun. 2005; pp. 1-10 and 14-20.

(Continued)

*Primary Examiner* — Allyson Trail
(74) *Attorney, Agent, or Firm* — Barnes & Thornburg LLP

(57) ABSTRACT

A loading system for loading a cargo hold (2) of an aircraft (1), containers, pallets or like ULDs (20) for accommodating freight being introduced into the cargo hold through an access opening, being transported by means of a transport device (60) and being fastened in transport positions. With the ULDs are identification devices (30), e.g. RFID transponders, which identification devices have storage devices for storing first data, especially identification data. The system comprises at least one first reading device (40) for reading the first data of a ULD introduced into the cargo hold, and at least one first transmitter device (50) for transmitting the first data to at least one first recipient (11).

29 Claims, 3 Drawing Sheets

(56) References Cited

FOREIGN PATENT DOCUMENTS

| WO | 01/75472 A2 | 10/2001 |
| WO | 2006/035401 A2 | 4/2006 |
| WO | 2007/122425 A1 | 11/2007 |

OTHER PUBLICATIONS

Klaus, Schmoetzer; Enhanced Cargo Monitoring—Container Communication Interface; International Aircraft Systems Fire Protection Working Group; Nov. 2005; pp. 1-23.

* cited by examiner

LOADING SYSTEM AND METHOD FOR LOADING A CARGO HOLD OF AN AIRCRAFT

CROSS-REFERENCE TO RELATED APPLICATIONS

This application is a National Stage of International Patent Application PCT/EP2009/005404, filed on Jul. 24, 2009, which claims priority to foreign German Patent Application No. 10 2008 034 576.8, filed Jul. 24, 2008 and German Patent Application No. 10 2008 057 076.1, filed Nov. 13, 2008, priority is claimed to these applications and the disclosures of which are incorporated by reference in their entirety.

FIELD OF THE INVENTION

The invention relates to a loading system for loading a cargo hold of an aircraft and a corresponding method thereof.

BACKGROUND OF THE INVENTION

Goods shipped by freight in high numbers are increasingly transported in containers, on pallets or like ULDs (unit load devices) in aircraft. The loading and unloading procedure should proceed as quickly and safely as possible. The freight must be stowed correctly in the aircraft's hold so that no damage occurs even during a turbulent flight. Thus problems arise on one hand in the area of logistics, that is in the planning and reconstruction of the transport routes and times, and on the other hand in the area of the loading and unloading procedures themselves.

SUMMARY

It may be desirable to develop a loading system for loading a cargo hold of an aircraft and a corresponding method thereof to the effect that its safety and speed are improved.

This may be achieved in terms of apparatus by a loading system described herein and in terms of method described herein.

A loading system is described for loading a cargo hold of an aircraft, containers, pallets or like unit load devices (ULD) for accommodating freight being introduced into the cargo hold through an access opening, being transported by means of transport devices and being fastened in transport positions. Identification devices, in particular RFID transponders, connected to the ULDs, are provided which identification devices have storage devices for storing first data, especially identification data. At least one reading device is provided for reading the first data of a ULD introduced into the cargo hold. In addition, at least one first transmitter device is provided for transmitting the first data to at least one recipient. In this way it is possible to notify the logistics companies involved precisely when, where and how the freight to be transported was introduced into the aircraft's cargo hold so that further planning is made easier.

Preferably, the aircraft or the cargo hold is provided with a cargo control computer such as is disclosed per se in DE 103 38 704 A1 for example. This cargo control computer is configured in such a way that the transport devices provided in the cargo hold are controlled partially automatically, partially by the loading staff in order to bring the freight to the space provided for each ULD or each container or each pallet in the cargo hold. The cargo control computer also monitors the transport devices, e.g. the roller conveyor devices (PDU—power drive unit). When these transport devices have faults, e.g. become unusable, the load computer records the faults as "second data" and can report them to the maintenance staff via the above-mentioned first transmitter device assigned to it (disposed within the cargo control computer or connected to it) and said staff can prepare the repair work and carry it out later at the aircraft's destination. In this way, maintenance and repair times are minimised and the first transmitter device provided for logistics data is optimally used.

The first transmitter device is preferably configured in such a way that the first and/or second data are transmitted before a take-off of the aircraft. This means that there can be no interference (EMI) with the aircraft's components.

In particular, the data may be transmitted as long as the freight system is "provided with power". This is usually the case at least from opening of the freight door until closing of the freight door. In this case, the freight door may not only be open during an actual loading procedure but also during the maintenance or other "ground times". In particular, the transmitter device should transmit data when it is worthwhile, that is to say it should only be operated if complete data blocks describing any procedure in full are present.

In addition, the first transmitter device may be configured in such a way that the first and/or second data or even third data referred to above, which include position data of the aircraft, are transmitted during the flight with the involvement of a second transmitter device that is installed in the aircraft. In this way, the data referred to above, for example, may also be transmitted at a later time after loading. Moreover, further tracking of the load may take place such that flight deviations (e.g. re-routing to a different destination airport) that the customer would otherwise only become aware of later are also registered and reported to the customer. Even in a case where at the time of loading, when transmission of the data ought really to take place, there are system faults, it is possible in this way for the data to be transmitted correctly.

The first reading device is preferably configured and attached to the access opening to the cargo hold in such a way that the freight's data can be read as it is passing through said access opening. This ensures that every ULD fitted with an RFID transponder can be safely identified as the reading device only has to register a defined cross-section. Moreover, a plurality of reading devices may be attached here in such a manner that the distance that the reading device can register from the RFID transponder is safely below the maximum.

The identification devices preferably have writable storage devices for storing the data describing the freight. As a result, when loading a container or a pallet, the RFID transponder attached to it may be programmed with a "freight list" which in turn makes it easier to identify the freight and track it.

Environmental sensors for recording environmental data, e.g. temperature or humidity, may be provided in the cargo hold and/or on the ULDs wherein the data is stored in the identification devices and/or is stored and/or transmitted via the first transmitter device in particular together with time signals. In this way it is possible to monitor the "quality" of the transport and render it traceable such that the causes of any damage occurring to the freight can be logged. Naturally, it is also possible to demonstrate by this means that the environmental influences causing the damage did not actually occur during transport in the aircraft.

The first transmitter device at least is configured for the transmission of signals in mobile phone networks. Nowadays such networks are practically always available at least at airports. Furthermore, it is advantageous if (additionally where appropriate) a satellite communication device is provided. Complete independence from local networks would be achievable as a result. It is also advantageous if the transmitter devices have transmitter/receiving devices of several standards in respect of operating frequencies, coding and protocols in order to thus ensure that public networks are available at each location of the aircraft. The same also applies at least for the first reading device which is preferably configured for communication with the identification devices based on various locations, e.g. in the case of RFID transponders which operate at 868 MHz or 915 MHz. In particular, if specific standards (in respect of the usable frequency range) are specified due to national regulations, it is advantageous if both the RFID transponder and also the reading device are all able to meet these various standards. Therefore, "sets", as it were, consisting of RFID transponders and reading devices are proposed which can be changed over from one standard to the other depending on the location of use.

The at least one first recipient referred to above is preferably configured to pass on received data to further recipients, in particular to logistics centres, maintenance centres or customers. This first recipient therefore represents a server that manages a network.

It was explained previously that freight data are stored in the RFID transponder which is attached to the ULDs. Alternatively or additionally, this first reading device or also a second reading device is configured for reading of second data which are stored in further identification devices (e.g. RFID transponders) that are connected to the freight. This reading of the data may be carried out by means of anti-collision procedures or bulk detection on passing through the access opening. Writing of the identification devices to the ULDs can also be carried out at this point; parallel storage of "freight lists", that is to say lists that assign the individual items of freight to specific ULDs (containers), can of course also be carried out externally, e.g. in the cargo control computer or in the first recipient (server) referred to above and can be called up again from there.

The first reading device is preferably connected to a detection device which ascertains the presence of a ULD, that is to say a container, a pallet or similar, at the first reading device in order to detect ULDs without identification devices. In this way, such ULDs (containers) are manually identifiable and their data can be transmitted to the first recipient by means of manual entry (e.g. via the cargo control computer). For such cases of ULD not furnished with an RFID of a suitable type, it is possible to provide separate identification devices, specifically held for such cases, that can be connected firmly but detachably to the ULD for the freight.

The cargo control computer preferably includes storage devices for storing and input devices for inputting target freight data. Comparator devices are provided in order to compare the second data of the second identification device with the target freight data and to emit alarm annunciations if no match exists. These second data include—as explained above—data of individual items of freight to which the identification devices are connected. This means that checking of the freight that is to be loaded and is already loaded can be carried out based both on such data that is stored in the RFID transponders which are attached to the ULDs or even to the items of freight themselves. If there is no match, an appropriate alarm annunciation can be emitted so that incorrect loading can quickly be accounted for.

As is generally known, different standards are used in mobile phone networks in different countries. It is now advantageous if a standard identification device is provided, which sets the transmitter devices to transmit data according to standards applicable at the location based either on position data (where the aircraft is located) or on test signals.

A similar problem exists with standards of storage devices or the reading devices associated with them. When RFID transponders are used (other transponders are also possible of course), the frequency bands permitted in the USA are different to those permitted in Europe. Therefore the reading device is preferably configured in such a way that it checks through the various standards and then sets itself to a specific standard, when an identification device responds to a signal receipt of the reading device transmitting in this standard. Safe functioning of the system is guaranteed particularly when ULDs originate from different countries and therefore also have different storage devices which work according to different standards.

The transport devices (e.g. PDUs) provided in the aircraft for moving the ULDs in the cargo hold are preferably connected to the cargo control computer via bus devices. Reading devices, the output signals of which are transmittable to the cargo control computer by way of the bus device, may now be disposed in or on the PDUs. In this way separate wiring of the reading devices is not necessary. Furthermore, it is possible in this way to attach a plurality of reading devices in the cargo hold in such a way that, even despite a high loading speed, there always remains sufficient time to carry out reading procedures. It is possible to ensure accurate reading and verification of freight data, including their position in the cargo hold, particularly when reading devices are provided on end positions of ULDs and this in turn makes it easier to load and thus trim an aircraft.

Furthermore, these reading devices may also include sensor devices which are attached to the transport devices (PDUs) in a manner known per se for ascertaining the presence of ULDs. In this case, therefore, one and the same sensor devices are used for different purposes. It is obvious that in this case the identification devices also include optically readable "markings" that can be scanned by optical sensors of the PDUs.

Moreover, the identification devices may also include measurement data storage devices, in which measurements of the associated ULDs including those of the freight stored in the ULD are storable. These data are read by the reading device in such a way that in the cargo control computer a favourable, collision-free stowage space in the cargo hold is ascertainable for each individual ULD. This is particularly advantageous if, for example, freight that protrudes beyond the pallet is loaded onto a pallet.

In principle, the identification devices may be attached anywhere on a ULD. If the ULD is configured as a container or pallet, the identification devices are advantageously attached in an outwardly projecting lower margin of the container or pallet. These outwardly projecting lower margins are necessary anyway in order to anchor the ULDs to their stowage space. This special type of attachment has a plurality of advantages. On one hand the identification devices are always attached as far as possible on the outside of a ULD such that the best possible proximity to the reading device is assured on entering the cargo hold. On the other hand this ensures that the identification devices sit at a defined height whereby attachment at floor level has the additional advantage that the reading device can also sit in the floor of the cargo hold such that the reading device does not collide with freight even if it sits in an area over which the ULDs run. In this case, the lower margin of the ULDs is preferably configured as a hollow body or hollow section and, in the region in which antenna devices of the identification devices are provided, is made from a material that is permeable to electromagnetic waves. As a result, the identification devices are optimally protected against harm.

At least two identification devices are preferably attached to the ULDs at a distance from each other. On one hand it is possible as a result to ensure increased redundancy in that the data to be read are present in duplicate. Furthermore, this results in an increased insensitivity in relation to distances between reading device and identification device that are too great since with appropriate attachment on the ULDs at least one identification device is always close to a reading device as the ULDs are inserted into the cargo hold or are positioned therein.

A similar effect may be achieved in that one identification device includes a transponder that has at least two antenna devices standing at an angle to each other. This make it possible to achieve an alignment characteristic that is improved to such an extent that greater insensitivity is achieved in relation to distances that are too great or in relation to unfavourable positioning. In both cases, however, that is to say both with a plurality of identification devices at a distance from each other and also with at least two antenna devices standing at an angle to each other, it is also possible to use the transmission and receiving devices in the identification devices for position detection of the ULDs. This may take place by way of both operating time or phase comparisons or, if necessary, also by way of amplitude comparisons of the transmitted or received signals.

In a further embodiment of the invention, a ULD reading device is attached to the ULDs in such a manner that during or after unloading of freight, its identification data are read off via the ULD reading device and stored in the identification devices connected to it. Alternatively or additionally, the identification data may be transmitted by way of transmission devices that may also be attached to the ULDs for storage at a remote location. In this case, therefore, identification devices that make each item of freight (or also groups thereof) identifiable for the ULD reading device are also attached in turn to the freight itself.

The first (or even a different) transmitter device is preferably configured in such a way that the first and/or second data and/or third data, which include position data of the aircraft, are transmitted during a flight with the involvement of a second transmitter device that is installed in the aircraft. In this manner, there is a further (long) time period available on one hand for transmitting freight data to the logistics companies involved, the destination airport, etc. On the other hand it is possible as a result to track the freight's route and its position at any time exactly such that any items of freight that get lost are trackable, particularly when there is a partial unloading of the freight.

In a further embodiment, the identification devices include receiving devices for receiving the data describing the individual items of freight from individual items of freight in the cargo. The identification devices may receive data transmitted by the individual items of freight that describe the individual items of freight, e.g. with the help of an RFID tag. As a result, the data describing the freight need not be entered manually into the identification device.

Preferably, the ULD includes an electrically conductive base and/or an electrically conductive cover (or also wall) as an antenna for transmission of the first data and/or the data describing the freight to one of the reading devices. The reading devices may be first reading devices and/or ULD reading devices. One advantage of this is that one has a large-surface antenna for transmitting which has greater sensitivity on one hand, and on the other remains longer within receiving range of the reading device during movements of the ULD due to its large-surface expansion and therefore on has more time to detect the data of the ULD that describe the freight using one of the reading devices. The speed at which the ULD is moved through the reading device's receiving range can therefore be increased.

The method according to an embodiment of the invention for loading a cargo hold of an aircraft achieves the object defined at the outset as follows:

Containers, pallets or like ULDs for accommodating freight are introduced into the cargo hold through an access opening and are transported by means of transport devices and fastened in transport positions;

identification devices, in particular RFID transponders, are connected to the ULDs, which identification devices have storage devices for storing first data, especially identification data;

the first data of a ULD introduced into the cargo hold are read by means of at least one first reading device and the first data are transmitted by means of at least one first transmitter device to at least one first recipient.

Dependent claims 2 to 25 also describe the procedure considered to be according to the invention.

BRIEF DESCRIPTION OF THE DRAWINGS

The invention will be explained in greater detail in the following on the basis of the schematic drawings attached. The drawings show FIG. 1 A first embodiment of the invention, FIG. 2 A second embodiment of the invention similar to that according to FIG. 1, FIG. 3 A top view onto a container or a pallet with indicated attachment of identification devices and FIG. 4 A section along line IV-IV from FIG. 3.

DETAILED DESCRIPTION

Figure 1:
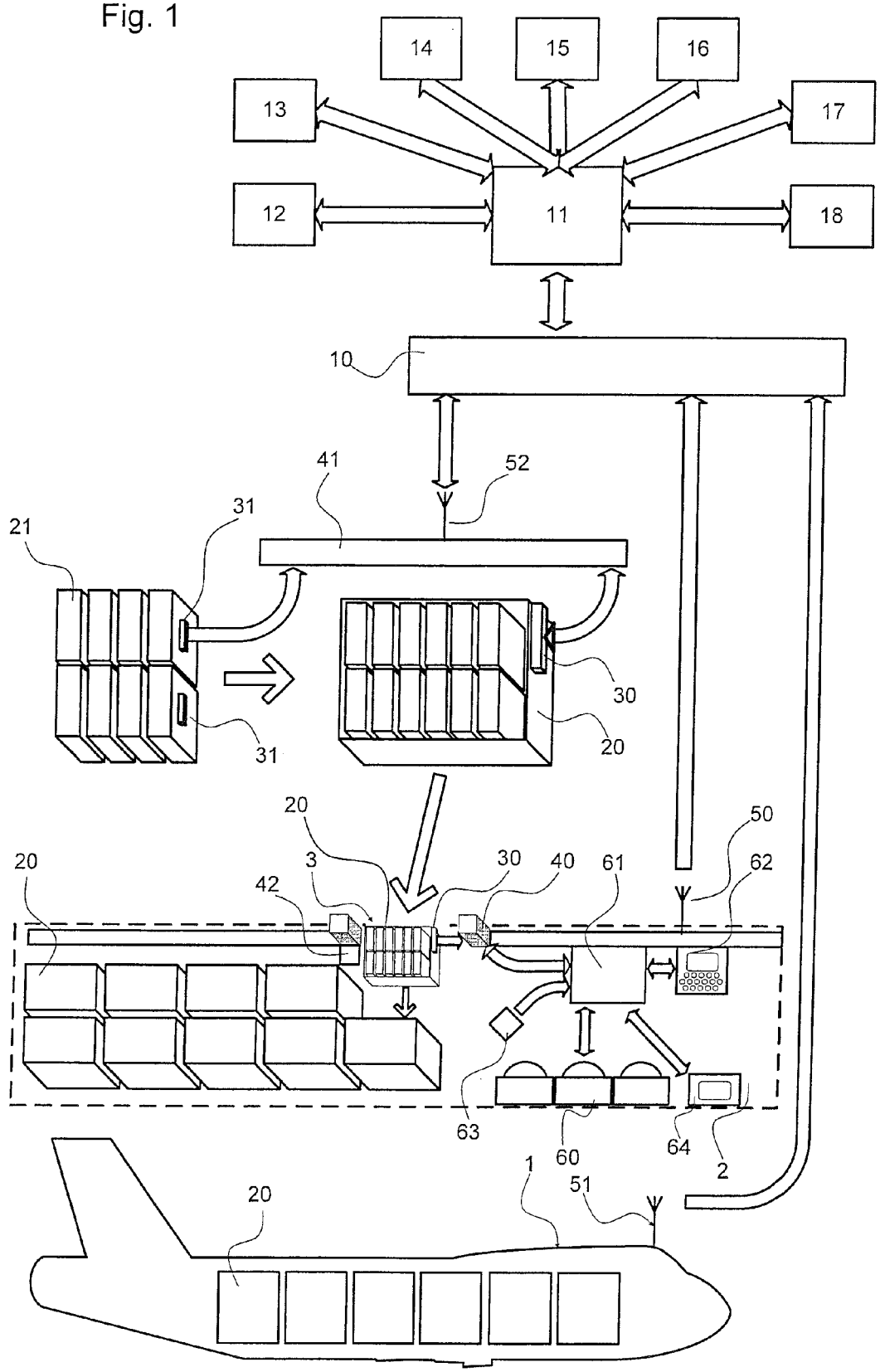

The same reference numerals are used in the following description for identical parts and parts acting in an identical manner.

Freight 21, of which a group of eight items is illustrated here, is provided with identification devices 31. Freight 21 is loaded into a ULD 20 for freight 21 represented here as a container. At the same time identification devices 31 are read by way of a reading device 41. In addition, an identification device 30, which is attached captively on container 20, is read by way of reading device 41. These data are communicated by way of a transmitter device 52 and a public mobile phone network 10 (or by way of a satellite-assisted system) to a first recipient 11, which is configured as a server. This can forward the data to clients 12-18, e.g. logistics or service companies, freight forwarders, airports, etc. Thus, at this point there is a clear assignment of freight 21 to a specifically identifiable container 20. The freight data can also be written by way of reading device 41 into writable storage devices that are provided in identification devices 30 of container 20. In this case, therefore, the freight data are then stored so as to be retrievable in identification device 30 attached captively on the container.

Loaded containers 20 are introduced through an access opening 3 into cargo hold 2 of an aircraft 1. In the process, identification devices 30 are read by way of a reading device 40. Reading device 40 is configured as a gate at the access opening or door 3 of cargo hold 2 such that reading of identification devices 30 (and if necessary also of identification devices 31) is readily possible. These identification devices are preferably configured as RFID transponders, which preferably operate in the UHF range, that is to say at 868 MHz in Europe and at 915 MHz in the USA.

The data read by reading device 40 are communicated to a cargo control computer 61 (or a separate computer that is connected if required to cargo control computer 61) which is attached in aircraft 1. This cargo control computer 61 primarily has the task of controlling transport devices 60, e.g. referred to as power drive units (PDUs), by way of an input and output device 62 and of monitoring their functions. If a problem occurs at a PDU 60, this is detected by means of appropriate sensors and communicated to cargo control computer 61. This then transmits an appropriate message by way of a transmitter device 50 to public network 10 such that a service company established at the destination airport, which then, for example, represents client 13, can be notified and, after aircraft 1 has landed, can easily carry out the appropriate repair measures since there has been sufficient time available for preparation.

The data read by reading device 40 are transmitted by the same route, that is to say cargo control computer 51 and transmitter device 50 assigned to it, to public mobile phone network 10 and from there are communicated to the interested logistics company (client 12-18).

Also provided at access opening 3 of cargo hold 2 is a detection device 42 which ascertains whether a container 20 or a different ULD is located in the region of access opening 3. If this is the case and if reading device 40 cannot establish "any contact" with an identification device 30, then this means that identification device 30 of container 20 just entering is inoperative or that container 20 does not actually have any identification device. In this case, the operating staff can enter appropriate data manually via input/output device 62 of the cargo control computer. Input/output device 62 of cargo control computer 61 is therefore used on one hand for operation of transport devices 60 and also on the other hand to enter freight data which is then stored in cargo control computer 61 (or a separate computer) and forwarded by way of transmitter device 50.

Additionally provided in cargo hold 2 are environmental sensors 63 by way of which the temperature or humidity, for example, can be measured in cargo hold 2 and can be transmitted by way of cargo control computer 61 and transmitter device 50 to interested clients 12, 13. This transmission procedure preferably takes place after a flight has ended such that the environmental data can first be stored temporarily in cargo control computer 61.

It is also possible to equip the identification devices additionally with environmental sensors the data of which is then stored in identification devices 30. In this way, every container 20 can provide information about "its transport history". This may take place, for example, on unloading by reading by means of reading device 40.

In the attached drawings, a further transmitter device, which enables transmission of data during a flight, is denoted by reference numeral 51. This transmitter device 51 is preferably connected to cargo control computer 61 or to transmitter device 50 in such a manner that data, which for any reason (e.g. malfunction of the public network at the departure airport) could not be transmitted. It is also possible during the flight to transmit position data that are generated by means of a GPS system in cargo control computer 61. In this way, it is possible to notify interested client 12-18 (e.g. a logistics company) continuously about the whereabouts of the freight to be transported.

Cargo control computer 61 has storage devices for storing and input devices 62 for inputting target freight data. Comparator devices are provided in order to compare the second data, that is to say the data of freight 21 read from identification devices 31, with the target freight data. An alarm annunciation (optical and/or acoustic) is then emitted if no match exists. Naturally, it is possible not to provide input device 62 for inputting the target freight data but rather to input the data electronically in cargo control computer 61 by way of transmitter device 50. Thus the term "transmitter device" is always understood to be a complete transmitter/receiver unit.

Figure 2:
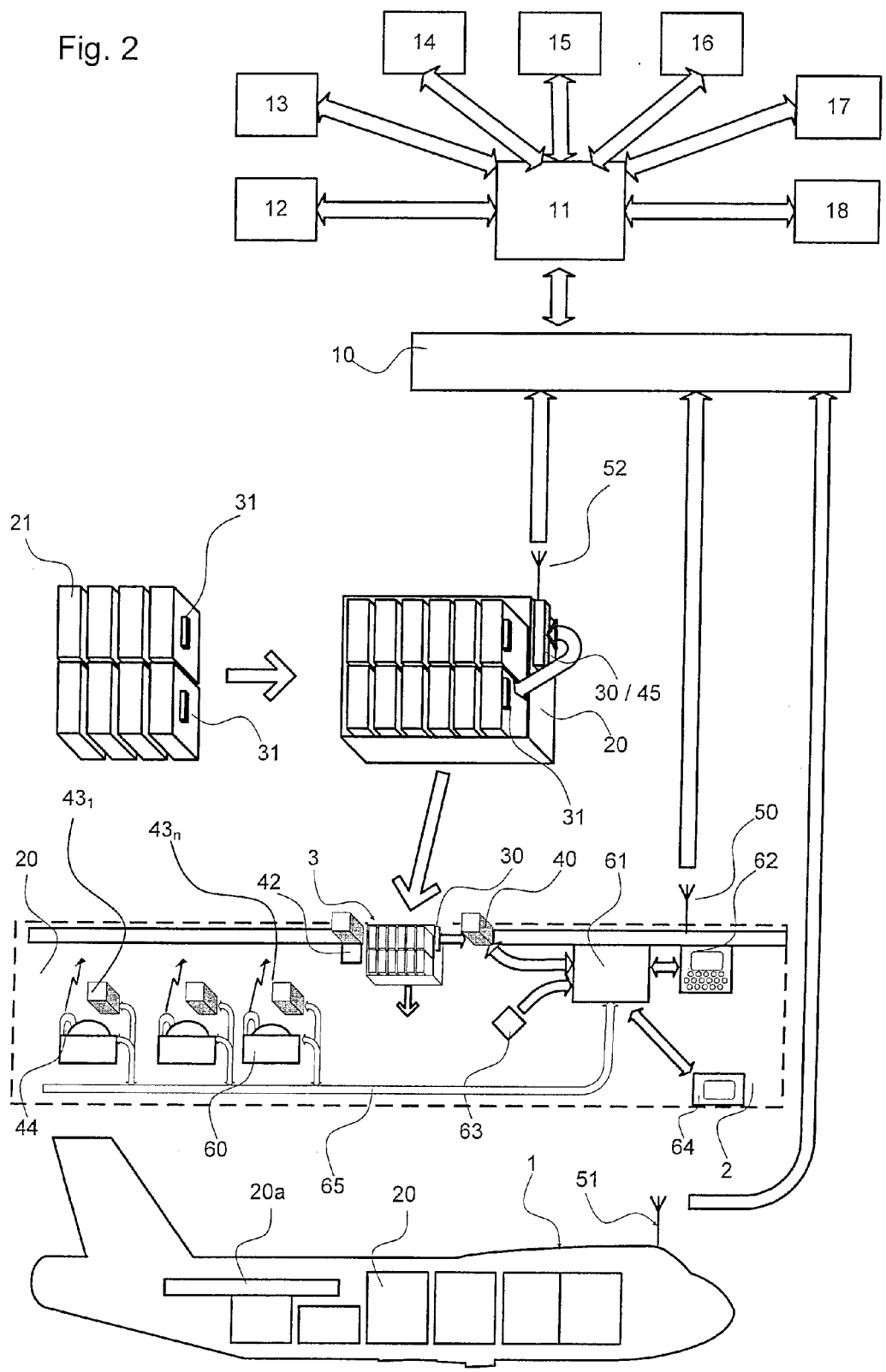

The embodiment of the invention illustrated in FIG. 2 differs from that according to FIG. 1 by a plurality of features.

In the embodiment according to FIG. 1, the freight data from identification devices 31 attached to freight 21 are read into identification device 30, which is attached on container 20, by means of a second reading device 41. In the embodiment illustrated in FIG. 2, not only an identification device 30 but also a ULD reading device 45, which reads and stores the data from identification devices 31, is provided on container 20. This has the advantage that a longer time span is available for reading and it can be ensured that only the freight actually in container 20 is detected.

In addition, in the embodiments illustrated in FIG. 2, PDUs 60 are connected to cargo control computer 61 by way of a bus system 65. Beyond this, reading devices $43_1$-$43_n$, which are connected to cargo control computer 61 by way of the same bus system, are provided at or on PDUs 60. In this way, bus system 65 already present per se in cargo hold 2 for a different purpose (for activating PDUs 60 and for receiving data from PDUs 60) is used for quite a different purpose, namely in order to bring reading devices $43_1$-$43_n$ into communication with cargo control computer 61. By attaching reading devices $43_1$-$43_n$ or in the case of PDUs 60, and particularly in the floor region, it is possible to read identification devices 31 inside cargo hold 2.

In addition, in a manner known per se PDUs 60 have sensor devices 44 which are provided in order to ascertain when a container 20 is located within range of a PDU 60. The same sensor devices 44 could now also be used in order to read identification devices (not illustrated here) on ULDs 20 and to transmit the data (again by way of bus system 65) to cargo control computer 61 (or a further computer).

Finally, FIG. 2 also shows that a ULD 20 may include a special freight 20a which requires a specific type of accommodation in the cargo hold 2 of the aircraft 1. In this case, a set of measurement data is read into associated identification device 30 prior to inserting special freight 20a, said data then being communicated to cargo control computer 61 on insertion into cargo hold 2. Consequently, this computer takes the special dimensions of freight 20a into consideration both when searching for a stowage position and also during the insertion procedure itself. Such freight data, particularly the weight of freight 21 and its distribution inside ULD 20 can also be stored in identification devices 30/31 such that cargo control computer 61 can accordingly allow for these data when trimming the aircraft.

Figure 3:
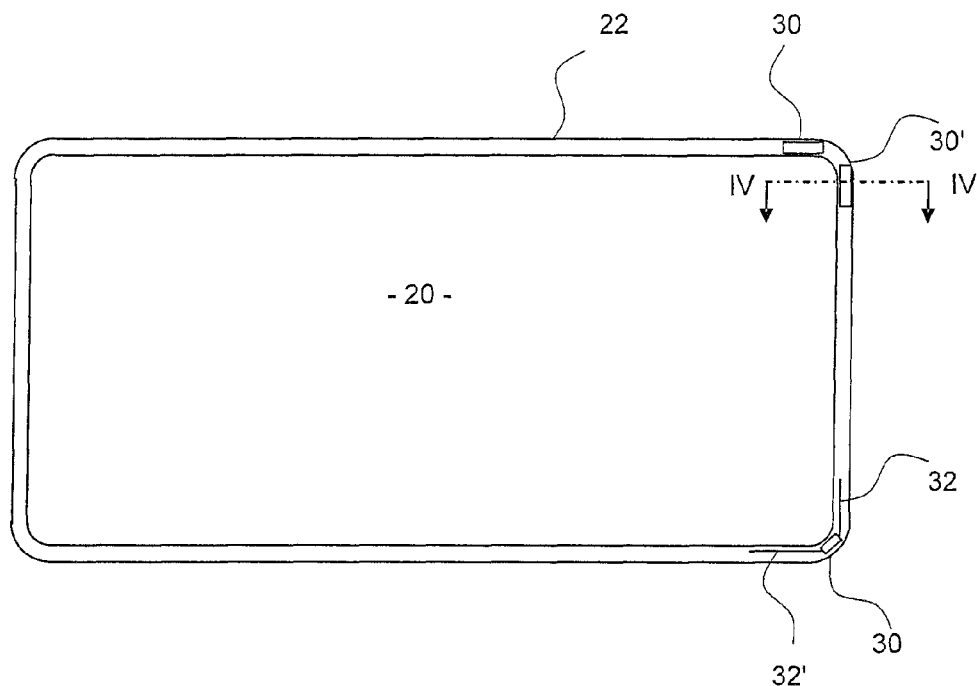
Figure 4:
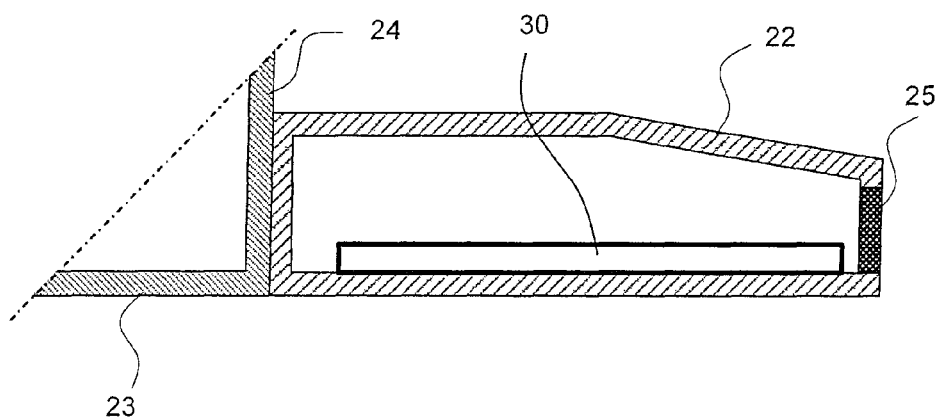

FIGS. 3 and 4 illustrate—in highly diagrammatic form—a ULD in a top view (FIG. 3) and respectively in a sectional view along line IV-IV from FIG. 3. ULD 20, e.g. a container, has an outwardly projecting (generally standardised) lower margin that protrudes substantially outwards in alignment with a base 23 of a side wall 24 of container 20. This lower margin 22 is usually used among other things for lashing or locking container 20 in its stowage position. In the embodiment of container 20 illustrated in FIGS. 3 and 4, this lower margin 22 is configured as a hollow section (in particular as an extruded section). In the embodiment according to FIG. 3, a first arrangement of two identification devices 30, 30' is illustrated in the top right corner in the hollow space thus created. These identification devices are attached on two lateral sections of lower margin 22 standing vertically on top of each other such that directional independence is achieved on moving container 20 past a reading device 40, 41. In addition to this, it is possible, by means of appropriate electronic measures (operating time or phase comparison) of the transmitted and received signals that are exchanged between identification devices 30, 30' and reading devices 40, 41, to obtain information about direction and speed in respect of associated container 20. This information can be used in cargo control computer 61 on inserting container 20 into cargo hold 2 to achieve more favourable transport speeds and stowage spaces.

In the arrangement illustrated bottom right in FIG. 3, an identification device 30 is provided with two antenna devices 32, 32' standing vertically to each other by means of which position and/or speed data can also be obtained.

Finally, it is again indicated in FIG. 4 that lower margin 22, which usually consists of aluminium or similar sturdy material, is breached in the region of identification device 30 and sealed using material 25 which is permeable to electromagnetic waves. As a result, it is easy to read the data from identification device 30. Naturally, identification device 30 may also be cast-in in the cavity in an appropriate material which brings about increased safety against damage. In order to read data by means of a reading device that is installed in the floor of the cargo hold, lower margin 22 may be configured on its underside (at least in the region of antenna devices of identification device 30) using permeable material 25.

LIST OF REFERENCE NUMBERS

1 Aircraft
2 Cargo hold
3 Access opening
10 Public network
11 First recipient/server
12-18 Client
20 ULD/Container
20a Special freight
21 Freight
22 Lower margin
23 Base
24 Side wall
25 Permeable material
30 Identification device/RFID tag
31 Further identification device/RFID tag
32, 32' Antenna device
40 First reading device
41 Second reading device
$43_1$-$43_n$ Reading device
42 Detection device
44 Sensor device
45 ULD reading device
50 First transmitter device
51 Second transmitter device
52 Third transmitter device
60 Transport device (PDU)
61 Cargo control computer (CCC)
62 Input/output device (control panel)
63 Environmental sensors
64 Display device
65 Bus system

The invention claimed is:

1. Loading system for loading a cargo hold of an aircraft, containers, pallets or like unit load devices (ULDs) for accommodating freight being introduced into the cargo hold through an access opening, being transported by means of transport devices and being fastened in transport positions, wherein a cargo control computer is provided, comprising:
   identification devices connected to the ULDs, which identification devices have storage devices for storing first data, especially identification data,
   at least one first reading device for reading the first data of a ULD introduced into the cargo hold, and
   at least one first transmitter device for transmitting the first data to at least one first recipient, wherein at least two identification devices are attached to each of the ULDs at a distance from each other.

2. Loading system according to claim 1, further comprising: that a cargo control computer, which includes the first transmitter device or is connected to this device, is provided to control and/or monitor the transport devices.

3. Loading system according to claim 2, wherein the cargo control computer is configured in such a way that second data, in particular error data, are transmitted via errors in the transport devices to at least one first recipient.

4. Loading system according to claim 1, wherein the first transmitter device is configured in such a way that the first and/or second data are transmitted before a take-off of the aircraft.

5. Loading system according to claim 1, wherein the first reading device is configured and attached to the access opening in such a way that the freight's data can be read as it is passing through said access opening.

6. Loading system according to claim 1, wherein the identification devices include writable storage devices for storing the data describing the freight.

7. Loading system according to claim 6, wherein the identification devices include receiving devices for receiving the data describing the individual items of freight from individual items of freight in the cargo.

8. Loading system according to claim 6, wherein the ULD includes at least one of the following: an electrically conductive base, wall, and an electrically conductive cover as an antenna for transmission of at least one of the following: the first data and the data describing the freight to one of the reading devices.

9. Loading system according to claim 1, wherein provided in one of the cargo hold and on the ULDs are environmental sensors for recording environmental data, wherein the data is stored in one of the identification devices and first transmitter device and transmitted via the first transmitter device in particular together with time signals.

10. Loading system according to claim 1, wherein the first transmitter device is configured for the transmission of signals in mobile phone networks and/or satellite networks.

11. Loading system according to claim 1, wherein the first transmitter device has transmitter/receiving devices of several standards in respect of operating frequency, coding and test protocols.

12. Loading system according to claim 11, wherein a standard identification device is provided, which sets the transmitter devices to transmit data according to standards applicable at the location based either on position data or on test signals.

13. Loading system according to claim 1, wherein the first reading device is configured for communication with the identification devices and enables communication with RFID transponders at 868 MHz and 915 MHz.

14. Loading system according to claim 13, wherein the reading device is configured in such a way that RFID standards are checked through and the reading device is then set to a specific standard, when an identification device responds to a signal reception of the reading device transmitting in this standard.

15. Loading system according to claim 1, wherein the at least one first recipient is configured to pass on received data to further recipients.

16. Loading system according to claim 1, wherein the first reading device or a second reading device is configured for reading of second data which are stored in further identification devices which are connected to the freight.

17. Loading system according to claim 16, wherein the cargo control computer has storage devices for storing and input devices for inputting target freight data, and that comparator devices are provided in order to compare the second data of the further identification device with the target freight data and to emit alarm annunciations if no match exists.

18. Loading system according to claim 1, wherein the first reading device is connected to a detection device which ascertains the presence of a ULD at the first reading device in order to detect ULDs without identification device so that these can be identified manually.

19. Loading system according to claim 1, wherein power drive units connected to the cargo control computer via bus devices, are provided in the cargo hold for moving the ULDs, disposed in or on said power drive units are reading devices, the output signals of which can be transmitted to the cargo control computer via the bus devices.

20. Loading system according to claim 19, wherein the reading devices include sensor devices which are attached to the transport devices for ascertaining the presence of ULDs.

21. Loading system according to claim 1, wherein the identification devices include measurement data storage devices, in which measurements of the ULDs including the freight are storable and can be read off from the reading device in such a manner that a favourable collision-free stowage space for this ULD in the cargo hold can be ascertained in the cargo control computer.

22. Loading system according to claim 1, wherein the identification devices are attached in an outwardly projecting lower margin of the ULD that is configured as a container or pallet.

23. Loading system according to claim 22, wherein the lower margin is configured as a hollow body or hollow section and, in the region of antenna devices of the identification devices is made from a material that is permeable to electromagnetic waves.

24. Loading system according to claim 1, wherein at least one identification device includes a transponder that has at least two antenna devices standing at an angle to each other.

25. Loading system according to claim 1, wherein a ULD reading device, that is attached to the ULD in such a manner that during or after unloading of freight its identification data is read off via the ULD reading device and is stored in the identification devices connected to it or is transmitted via transmitter devices for storage at a remote location.

26. Loading system according to claim 1, wherein the first transmitter device is configured in such a way that at least one of the following: the first data, second data and third data, which include position data of the aircraft, are transmitted during a flight with the involvement of a second transmitter device that is installed in the aircraft.

27. Method for loading a cargo hold of an aircraft, containers, pallets or like ULDs for accommodating freight being introduced into the cargo hold through an access opening, being transported by means of a transport device and being fastened in transport positions whereby at least two identification devices spaced apart are connected to each of the ULDs, which identification devices have storage devices for storing first data, especially identification data, whereby the first data of a ULD introduced into the cargo hold are read by a first reading device and are transmitted by means of a transmitter device to at least one first recipient.

28. Loading system for loading a cargo hold of an aircraft, containers, pallets or like unit load devices (ULD) for accommodating freight being introduced into the cargo hold through an access opening, being transported by means of transport devices and being fastened in transport positions, wherein a cargo control computer is provided, comprising:
  identification devices connected to the ULDs, which identification devices have storage devices for storing first data, especially identification data,
  at least one first reading device for reading the first data of a ULD introduced into the cargo hold, and
  at least one first transmitter device for transmitting the first data to at least one first recipient,
  wherein at least two identification devices are attached to each of the ULDs at a distance from each other,
  wherein the first reading device or a second reading device is configured for reading of second data which are stored in further identification devices which are connected to the freight, and
  wherein the cargo control computer has storage devices for storing and input devices for inputting target freight data, and that comparator devices are provided in order to compare the second data of the further identification device with the target freight data and to emit alarm annunciations if no match exists.

29. Loading system for loading a cargo hold of an aircraft, containers, pallets or like unit load devices (ULD) for accommodating freight being introduced into the cargo hold through an access opening, being transported by means of transport devices and being fastened in transport positions, wherein a cargo control computer is provided, comprising:
  identification devices connected to the ULDs, which identification devices have storage devices for storing first data, especially identification data,
  at least one first reading device for reading the first data of a ULD introduced into the cargo hold, and
  at least one first transmitter device for transmitting the first data to at least one first recipient,
  wherein at least two identification devices are attached to each of the ULDs at a distance from each other,
  wherein the identification devices are attached in an outwardly projecting lower margin of the ULD that is configured as a container or pallet, and
  wherein the lower margin is configured as a hollow body or hollow section and, in the region of antenna devices of the identification devices is made from a material that is permeable to electromagnetic waves.

\* \* \* \* \*